No. 820,655. PATENTED MAY 15, 1906.
F. T. LIPPINCOTT.
STAGE SCREW.
APPLICATION FILED MAR. 6, 1905.

WITNESSES:
Carl Stoughton
M. B. Schley.

INVENTOR
Frank T. Lippincott
BY
Shepherd & Parker
ATTORNEYS

UNITED STATES PATENT OFFICE.

FRANK T. LIPPINCOTT, OF NEWARK, OHIO.

STAGE-SCREW.

No. 820,655.      Specification of Letters Patent.      Patented May 15, 1906.

Application filed March 6, 1905. Serial No. 248,719.

*To all whom it may concern:*

Be it known that I, FRANK T. LIPPINCOTT, a citizen of the United States, residing at Newark, in the county of Licking and State of Ohio, have invented certain new and useful Improvements in Stage-Screws, of which the following is a specification.

My invention relates to a new and useful improvement in stage-screws.

Heretofore the devices of this character have been formed in one piece, the threaded portion being made integral with the handle. The handle is often broken off or the threaded portion snapped in half, thereby rendering the parts worthless and necessitating the replacing of the screw with a new one, a very expensive and troublesome procedure.

The object of my invention is to overcome these difficulties and disadvantages by so constructing the device that an ordinary wood-screw may be readily and expeditiously attached to the handle, so that should the screw break a new one may be easily secured to the handle at a slight expense.

Finally, the object of the invention is to provide a device of the character described that will be strong, durable, efficient, simple, and inexpensive to make and one in which the several parts will not be liable to get out of working order.

With the above and other objects in view the invention consists of the novel details of construction and operation, a preferable embodiment of which is described in the specification and illustrated in the accompanying drawings, wherein—

Figure 1:
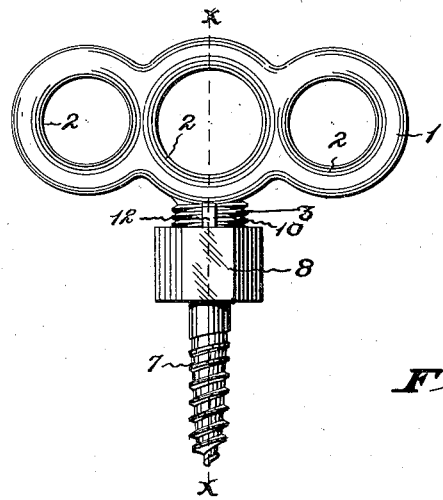
Figure 2:
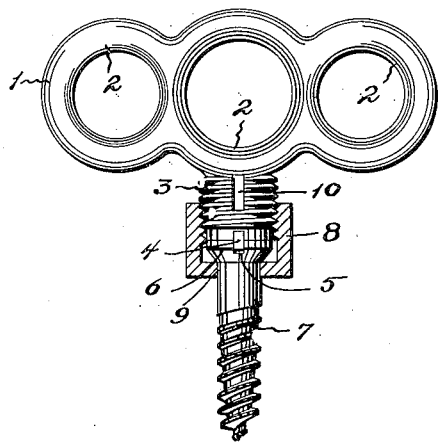
Figure 3:
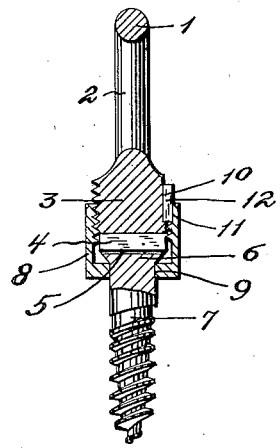

Figure 1 is an elevation of my improved stage-screw. Fig. 2 is a similar view with the coupling in vertical section; and Fig. 3 is a transverse vertical sectional view on the line $x\,x$ of Fig. 1, a portion of the wood-screw being shown in elevation.

In the drawings the numeral 1 designates the handle, which may be formed of any suitable metal and in any suitable form. However, I prefer to construct it with a plurality of connected ring-like portions—for instance, three, as indicated by the numeral 2 in the drawings. From the central ring 2 extends an enlarged and screw-threaded shank 3, a portion of the outer end of which is reduced in diameter and provided with a transverse lug 4. The lug 4 is of such thickness and depth as to readily engage in the usual groove 5 of the head 6 of an ordinary screw 7 and lock the screw against rotation independent of the handle, but causing the same to turn with the handle.

An internally-threaded coupling-nut 8, formed with a central opening 9, is engaged with the shank 3. The opening 9 is of such diameter as to allow the screw 7 to project therethrough, but to retain the head 6 within the nut 8. The nut being screwed onto the shank 3, the head of the screw is drawn toward the shank and the lug 4 being received by the groove 5 the handle 1 and the screw 7 are coupled or fastened firmly together. The parts being thus secured together are for all purposes the same as if formed integral. From the foregoing it will be apparent that should the screw be broken the nut 8 can be turned off the shank 3, the remaining portion of the screw removed, and a new screw inserted in the opening 9, when the parts may again be assembled and the device thus placed in condition for immediate use. The coupling-nut 8 may be screwed on the shank tightly enough to bind the parts against independent movement; but in some instances it may be found desirable and advantageous to form a recess 10 in the shank 3, so disposed as to register with a similar recess 11, formed in the screw-threaded portion of the nut, and to insert a key 12 in the recesses, thereby locking the nut against rotation. This, however, is not an essential feature of the invention and may be omitted, if desired.

In utilizing my invention the screw 7 may be inserted in the stage-floor, walls, or upper structure to provide a fixed point of attachment, so that cables, hooks, guy-ropes, &c., may be readily engaged with ring portions 2, and thus fastened to the handle 1, or the device may be used in connection with the various stage-settings and scenery-frames as a fastening means or coupling member.

My improved device while termed a "stage-screw" is not necessarily limited in its use thereby and can be used in various other places and manners where a device of such character would be useful and advantageous.

Having now fully described my invention, what I claim, and desire to secure by Letters Patent, is—

1. In a stage-screw, the combination with a screw having a groove, of a handle having one or more openings and provided with a shank carrying a projection adapted to enter the groove of the screw, and a coupling in which the screw is supported having movable engagement with the shank to removably connect the shank and the screw and hold the projection of the shank in the groove of the screw, the said coupling being arranged to hold the parts in rigid relation to each other.

2. In a device of the character described, the combination with a screw having a groove, of a handle, a threaded shank provided on the handle having a lug adapted to enter the groove of the screw, and a nut engaging with the shank for coupling the handle and screw together formed with an opening through which the screw passes.

In testimony whereof I affix my signature in presence of two witnesses.

FRANK T. LIPPINCOTT.

Witnesses:
JOSEPH RENZ,
JOHN A. COLLINS.